(12) United States Patent
Russ

(10) Patent No.: US 9,108,742 B2
(45) Date of Patent: Aug. 18, 2015

(54) RAM AIR TURBINE STOW ABORT ASSEMBLY

(75) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 707 days.

(21) Appl. No.: 13/430,894

(22) Filed: Mar. 27, 2012

(65) Prior Publication Data

US 2013/0256453 A1    Oct. 3, 2013

(51) Int. Cl.
*B64D 41/00* (2006.01)

(52) U.S. Cl.
CPC .......... *B64D 41/007* (2013.01); *F05D 2220/34* (2013.01)

(58) Field of Classification Search
CPC ............................ B64D 41/007; F05D 2220/34
USPC ........................................................ 416/142
See application file for complete search history.

(56) References Cited

U.S. PATENT DOCUMENTS

| | | |
|---|---|---|
| 2,248,405 A | 7/1941 | Freeman |
| 3,360,239 A | 12/1967 | Swearingen |
| 4,742,976 A | 5/1988 | Cohen |
| 4,991,796 A | 2/1991 | Peters et al. |
| 5,122,036 A | 6/1992 | Dickes et al. |
| 5,145,324 A | 9/1992 | Dickes et al. |
| 5,487,645 A | 1/1996 | Eccles |
| 5,564,903 A | 10/1996 | Eccles et al. |
| 6,331,099 B1 | 12/2001 | Eccles et al. |
| 6,580,179 B2 | 6/2003 | Eccles et al. |
| 6,676,379 B2 | 1/2004 | Eccles et al. |
| 7,077,631 B2 | 7/2006 | Eccles et al. |
| 7,086,760 B2 | 8/2006 | Chuang |
| 2007/0237640 A1* | 10/2007 | Russ .............................. 416/142 |
| 2011/0229309 A1 | 9/2011 | Russ |
| 2011/0229342 A1 | 9/2011 | Russ |
| 2011/0236218 A1 | 9/2011 | Russ et al. |

* cited by examiner

*Primary Examiner* — Liam McDowell
(74) *Attorney, Agent, or Firm* — Carlson, Gaskey & Olds, P.C.

(57) ABSTRACT

An example ram air turbine stow abort assembly includes a release pin movable between an engaged position that prevents rotation of a drive shaft and a released position that allows rotation of the drive shaft. A release lever is rotatable about an axis in response to the release pin being in the engaged position or the released position. A pawl has a link to the release lever. The link causes the pawl to move toward the axis from a locking position to a clearance position. The pawl is positioned to engage a lock when in the locking position to prevent movement of the ram air turbine assembly to a stowed position when the turbine blades are misaligned.

20 Claims, 12 Drawing Sheets

RAM AIR TURBINE STOW ABORT ASSEMBLY

BACKGROUND

This disclosure generally relates to a deployment mechanism for a ram air turbine. More particularly, this disclosure relates to a deployment mechanism that includes features preventing storage of the ram air turbine when the turbine is not in a desired orientation.

A ram air turbine is used to generate supplemental power in an aircraft by extracting power from an air stream proximate the exterior of the aircraft during flight. The ram air turbine includes a turbine that drives an electric motor or hydraulic pump. The turbine is suspended on a strut assembly. In operation, the turbine is moved outward from the aircraft to a position that provides clearance between blades of the turbine and the aircraft. A release mechanism prevents rotation of the blades until the turbine is sufficiently clear of the aircraft. Storage of the ram air turbine after use requires that the blades be again locked in a position that does not allow contact with the exterior surface or door of the aircraft.

Confirmation that the blades are locked in a stowable orientation is conventionally indicated by electronic sensors that sense a position of a release mechanism. The use of electronic sensors increases programming burdens and requires time consuming calibration and maintenance. Electrical stow abort mechanisms can bind due to ice, corrosion, etc.

SUMMARY

An example ram air turbine stow abort assembly includes a release pin movable between an engaged position that prevents rotation of a turbine drive shaft and a released position that allows rotation of the turbine drive shaft. A release lever is rotatable about an axis in response to the release pin being in the engaged position or the released position. A pawl has a link to the release lever. The link causes the pawl to move toward the axis from a locking position to a clearance position. The pawl is positioned to engage a lock when in the locking position to prevent movement of the ram air turbine assembly to a stowed position.

An example stow prevention assembly for a ram air turbine includes a release pin movable between an engaged position that fixes a position of a turbine drive shaft and a released position. A release lever is movable about a pivot post in response to a position of the release pin. A pawl has a link to the release lever. The pawl is movable between a clearance position and a locking position responsive to movement of the release lever. A locking ridge is engaged by the pawl when the pawl is in the locking position such that the ram air turbine is prevented from moving to a stowed position when the blades are out of position. The locking ridge is radially further from the pivot post than the link.

An example method of aborting stowage of a ram air turbine assembly includes moving a release pin between an engaged position that prevents rotation of a turbine drive shaft and a released position that allows rotation of the turbine drive shaft. The method pivots a release lever about an axis relative to a pawl in response to a position of the release pin. The position of the release lever relative to the pawl selectively forces the pawl to move toward the axis from a locking position to a clearance position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
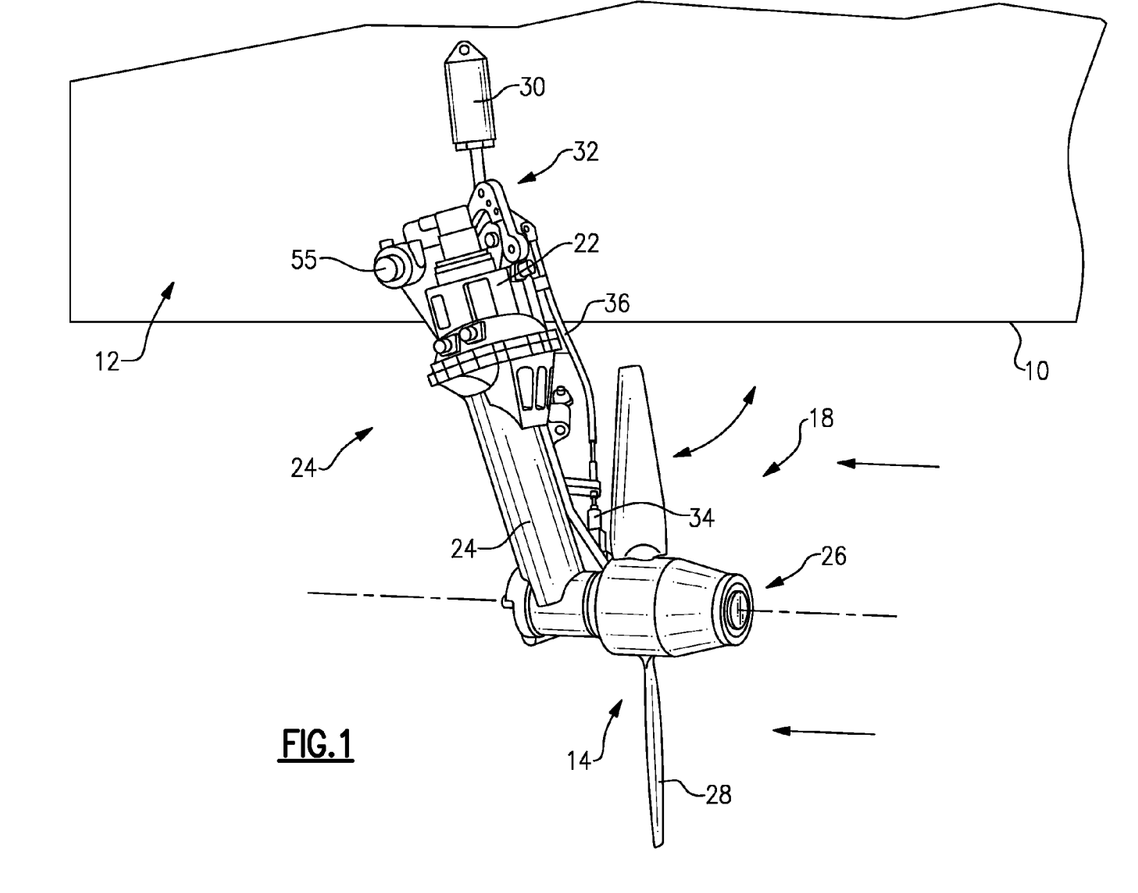
FIG. 1 shows an example ram air turbine (RAT) assembly in a deployed position.
Figure 2:
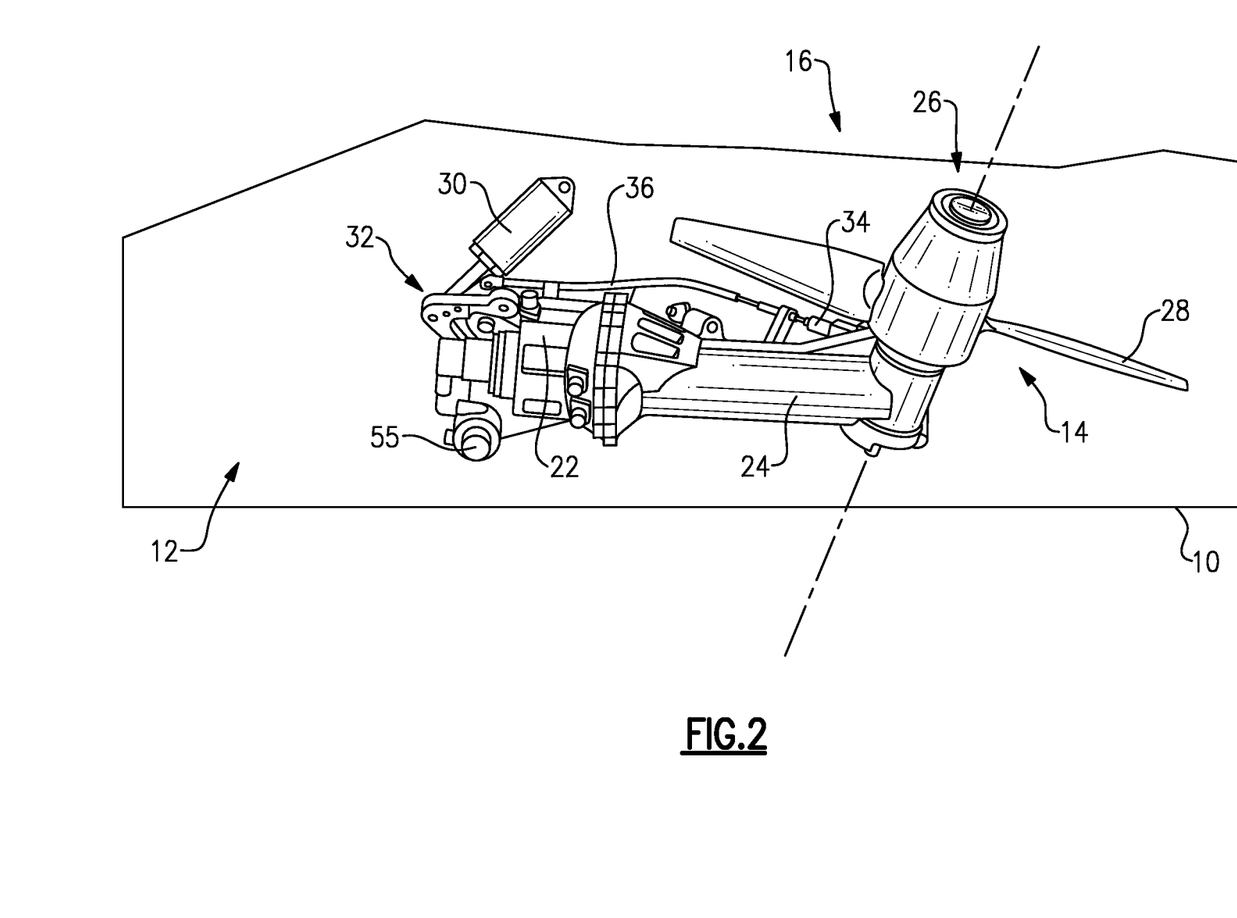
FIG. 2 shows the example RAT of FIG. 1 in a stowed position.

Referring to FIGS. 1 to 4, an example aircraft structure 10 is schematically indicated and includes a hatch 12 through which a ram air turbine assembly (RAT) 14 deploys from a stowed position 16 (shown in FIG. 2). The RAT 14 includes a turbine 26 with turbine blades 28 that rotate responsive to air flow along the outside of an aircraft. An actuator 30 moves the RAT 14 from the stowed position 16 to a deployed position 18. Orientation of the turbine blades 28 is maintained in a desired position to prevent contact with the aircraft structure 10 when moving to the deployed position and when moving from the deployed position.

A release pin 34 engages a turbine drive shaft 70 to maintain the desired position of the turbine blades 28 until clear of the aircraft structure 10. When the RAT 14 is near the deployed position 18, the release pin 34 is pulled from the turbine drive shaft 70 to allow rotation of the turbine blades 28.

Rotation of the turbine blades 28 drives a generator 22 housed within strut 24. The strut 24 supports the turbine 26 away from the aircraft structure 10 and within the airflow along the side of the aircraft. Although generator 22 is disclosed by way of example, the turbine 26 could also drive a hydraulic pump or other device. In one example, such a hydraulic pump is vertically above the generator 22 when the RAT 14 is deployed.

Once the need for the RAT 14 is complete, it can be moved back to the stowed position 16. However, the turbine blades 28 must be locked in a position that provides clearance through the hatch 12. Accordingly, a stow abort mechanism generally indicated at 32 (shown schematically in FIG. 2) is provided to prevent movement of the RAT 14 to the stowed position 16 when the turbine blades 28 are not in a desired position. The example stow abort mechanism 32 is linked to the release pin 34 through cable 36. The example cable 36 comprises a semi-rigid cable that moves within a protective sheathing to communicate a position of the release pin 34 back to the stow abort mechanism 32. As appreciated, the desired position of the turbine blades 28 is that position where the turbine blades 28 clear the aircraft structure 10 and fit through the hatch 12. Also, keeping the blades 28 from rotating within the aircraft structure 10 helps prevent contact between the structure 10 and the blades 28 as the RAT is deployed.

Referring to FIGS. 5 to 11, the example stow abort mechanism 32 includes a release lever 44 that is supported on a pivot post 55. The example pivot post 55 also supports rotation of the generator 22 and strut 24 of the RAT 14. The release lever 44 includes a connection 66 to the cable 36.

A fixed bracket 38 is a fixed structure mounted on the aircraft. That is, the fixed bracket 38 does not deploy with the RAT 14. The example bracket 38 is mounted to other fixed structures by pins and fasteners 42. The release lever 44 includes a stop 46 that contacts the fixed bracket 38 when the RAT 14 is near full deployment. Contact between the stop 46 and the fixed bracket 38 prevents further rotation of the release lever 44 and stabilizes the release lever 44 when the RAT 14 is fully deployed.

The release lever 44 includes a cam track 48 within which guides a pawl cam pin 50. A pawl 52 rotates about a pawl pivot pin 54. The pawl cam pin 50 is directly connected to the pawl 52. The cam track 48 and pawl cam pin 50 together provide a kinematic link between the release lever 44 and the pawl 52.

Figure 10:
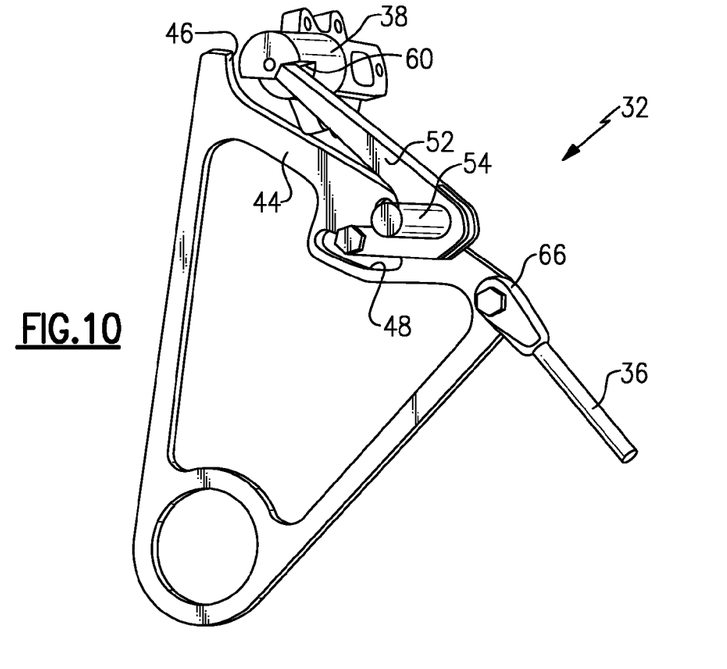
FIG. 10 is an isolated perspective view of component parts of the example stow abort mechanism when the component parts are preventing moving the RAT to a stowed position because the turbine blades of the RAT are in a position unsuitable for storing.

The pawl 52 is moveable between a clearance position (FIG. 9) and a locking position (FIG. 10). The pawl 52 in the clearance position permits movement of the RAT 14 to the stowed position. That is, provided the pawl 52 clears the locking ridge 60, the RAT 14 can move to the stowed position. The pawl 52 in the locking position limits movement of the RAT 14 to the stowed position.

When the release pin 34 contacts an outer diameter of the drive shaft 70 (FIG. 4), the release lever 44 does not cause the pawl 52 to rotate about pawl pivot pin 54 from the locking position. At least a portion of the pawl 52 and at least a portion of the fixed bracket 38 are disposed in a common plane such that, when in the locking position, a stop surface 58 of the pawl 52 contacts a lock, such as a locking ridge 60 of the fixed bracket 38.

Rotating the turbine blades 28 to a position where the release pin 34 moves into an opening 72 of the drive shaft 70 allows the release lever 44 to pivot relative to the pawl 52 to a position that permits movement of the pawl 52 away from the locking position.

The pawl 52 is supported on the pawl pivot pin 54, which is fixed to the generator 22, and, more specifically, a housing of the generator 22. Accordingly, the pawl 52 rotates with the generator 22 about the pivot post 55.

Figure 5:
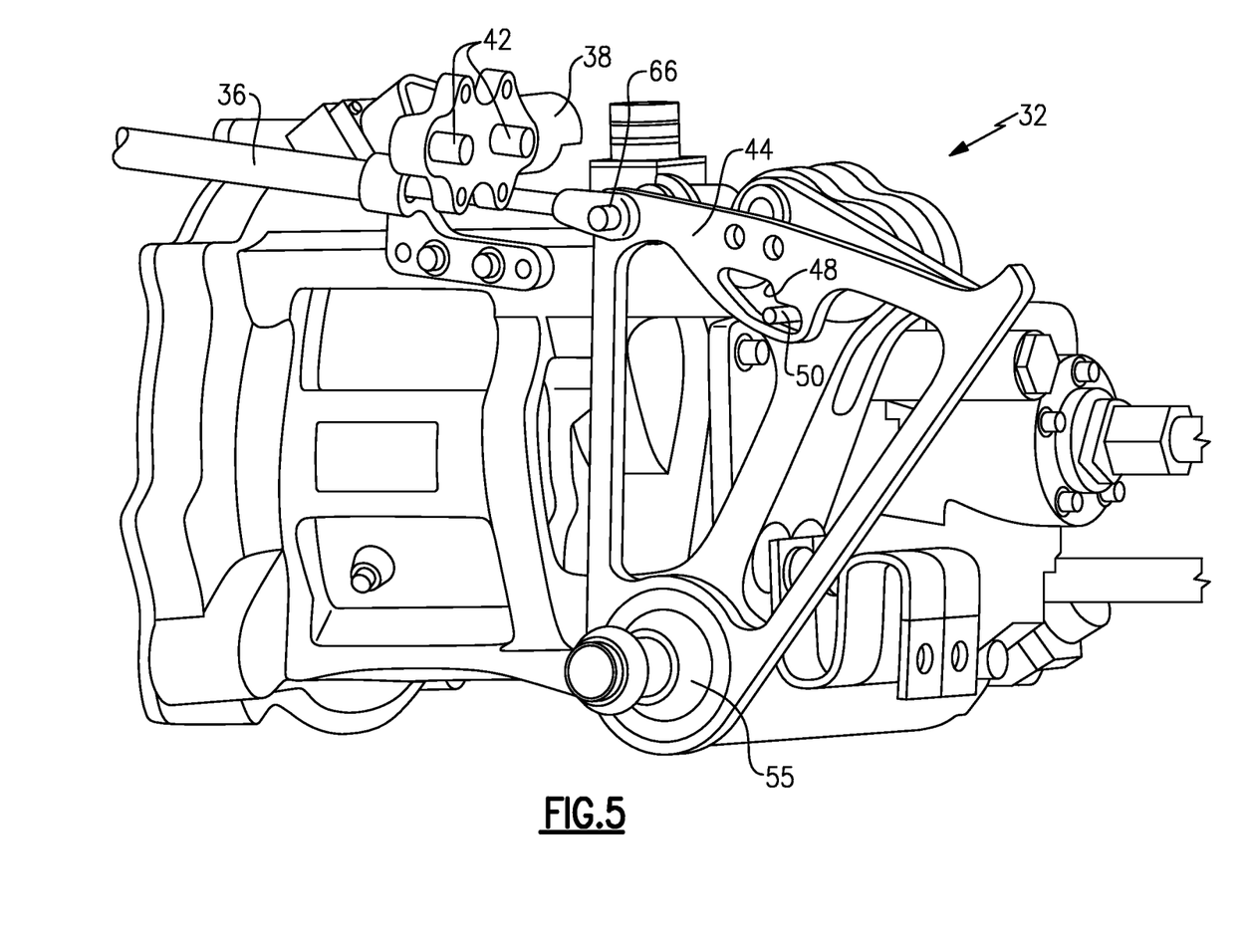
FIG. 5 is a perspective view of an example stow abort mechanism when the RAT is stowed.
Figure 6:
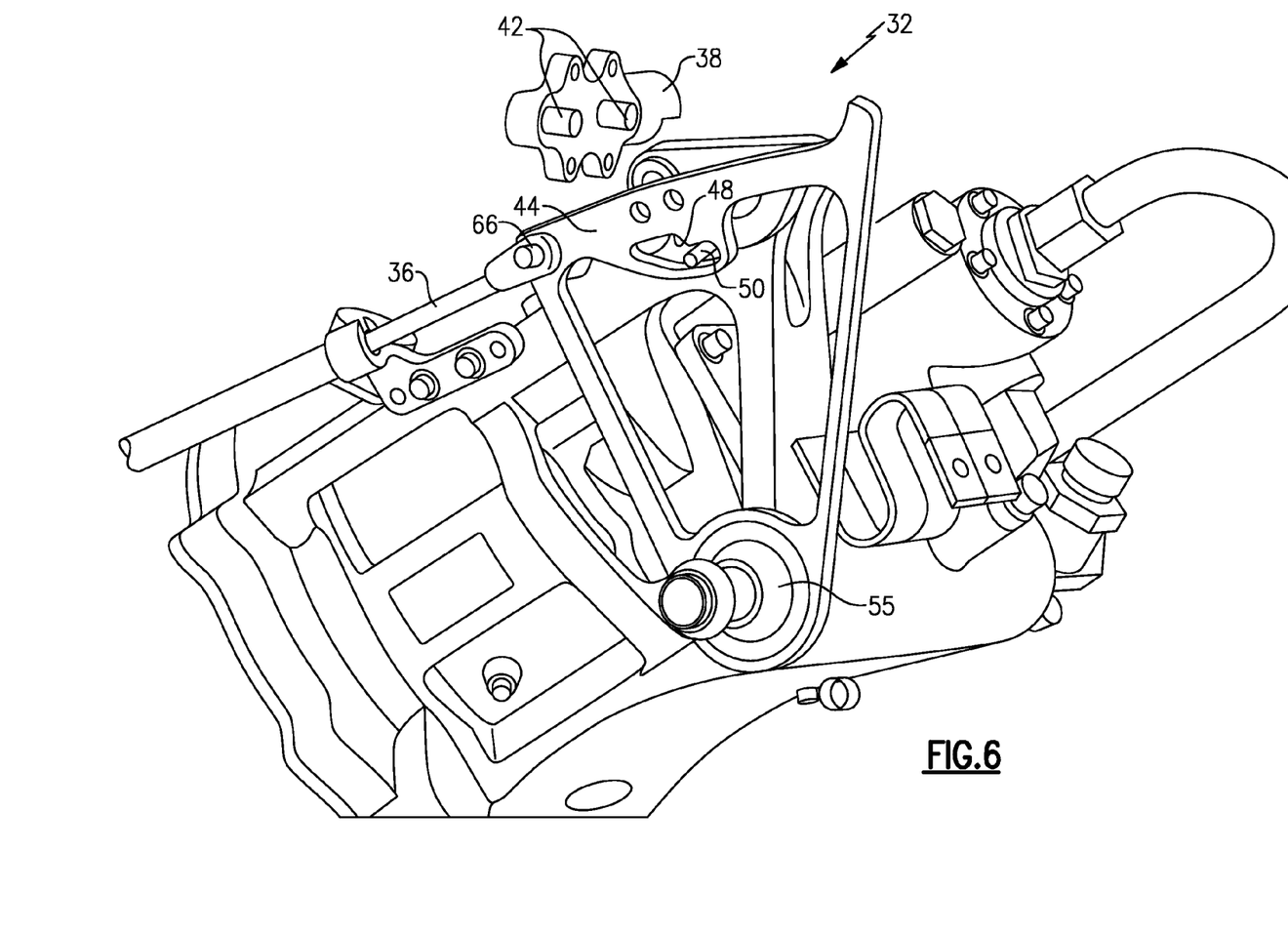
FIG. 6 is a perspective view of an example stow abort mechanism when the RAT is partially deployed.
Figure 7:
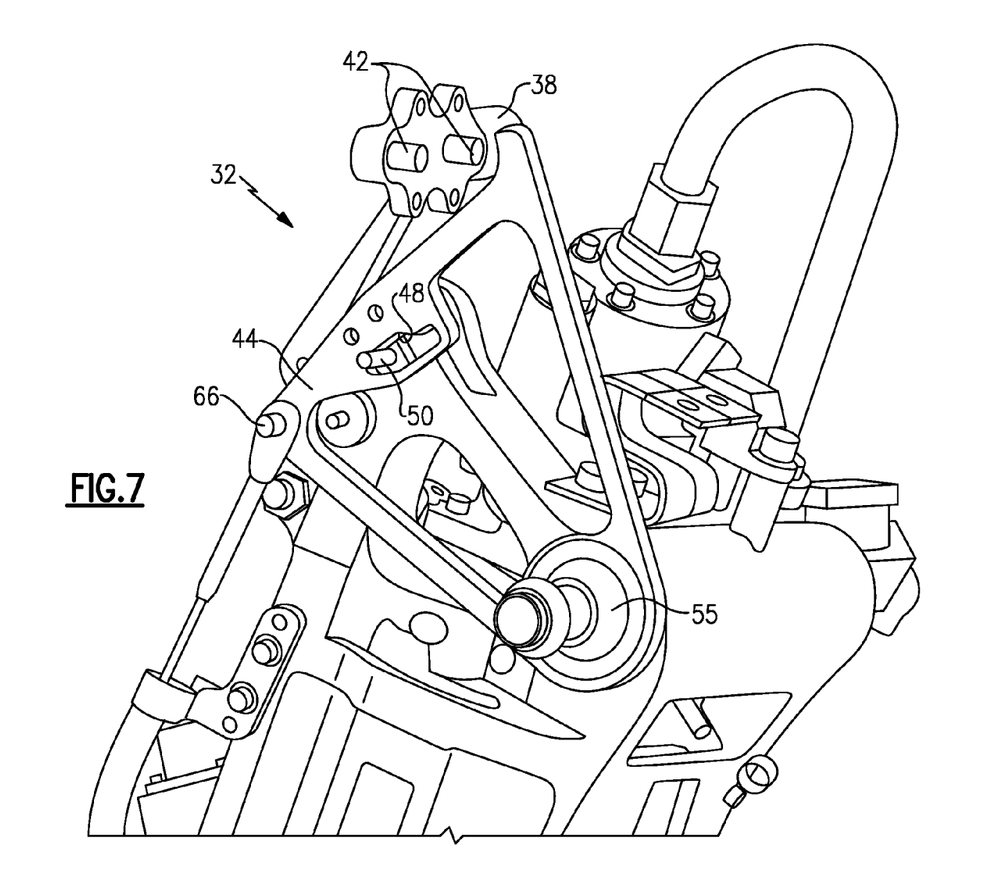
FIG. 7 is a perspective view of an example stow abort mechanism when the RAT is fully deployed.
Figure 8:
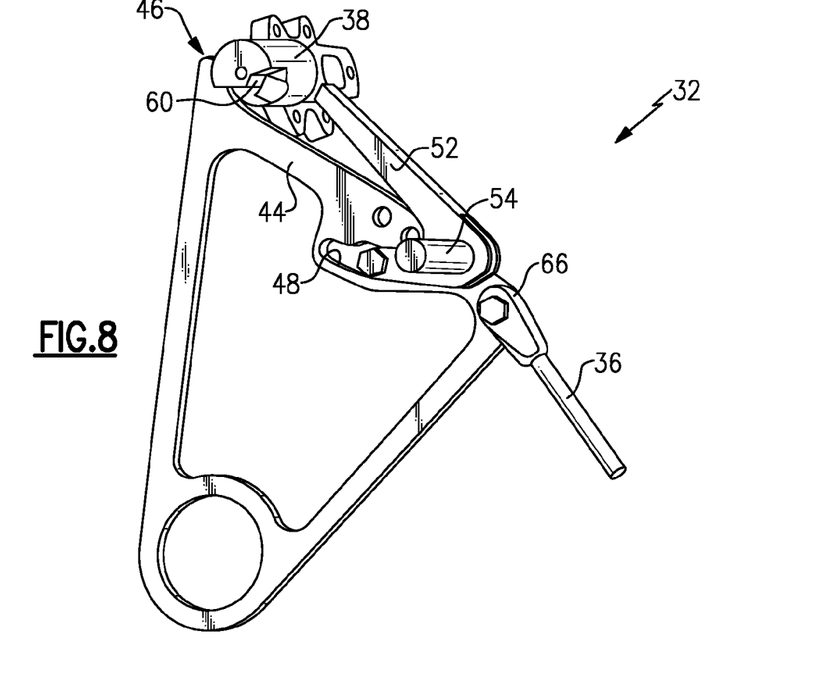
FIG. 8 is an isolated perspective view of component parts of the example stow abort mechanism when the RAT is fully deployed.
Figure 9:
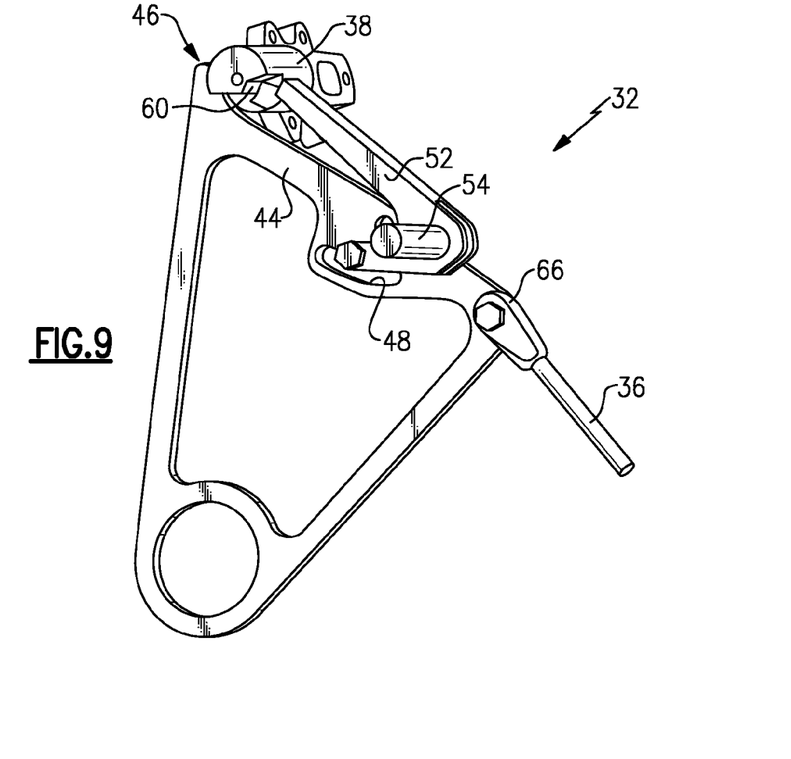
FIG. 9 is an isolated perspective view of component parts of the example stow abort mechanism when turbine blades of the RAT are in a position suitable for storing.

During deployment, both the pawl 52 and the release lever 44 rotate relative to the fixed bracket 38 about the pivot post 52 (from FIG. 5 to FIG. 6). Upon contacting the stop 46, the release lever 44 stops rotation, while the pawl 52 continues movement with the generator 22 (ending at FIG. 7). The continued movement of the pawl 52 includes a corresponding movement of the pawl cam pin 50 within the cam track 48 (compare FIG. 5 and FIG. 7).

As will be explained in more detail, if the release lever 44 is not moved responsive to the release pin 34 engaging the drive shaft 70 as the RAT 14 is stowed, then movement toward the stowed position 16 will be prevented by engagement of the stop surface 58 with the locking ridge 60. That is, if the release lever 44 is not moved responsive to the release pin 34 engaging the drive shaft 70, the pawl 52 (and the stop surface 58) will not be able to rotate about the pawl pivot pin 54 to a position that allows the stop surface 58 to pivot past the locking ridge 60.

Figure 12:
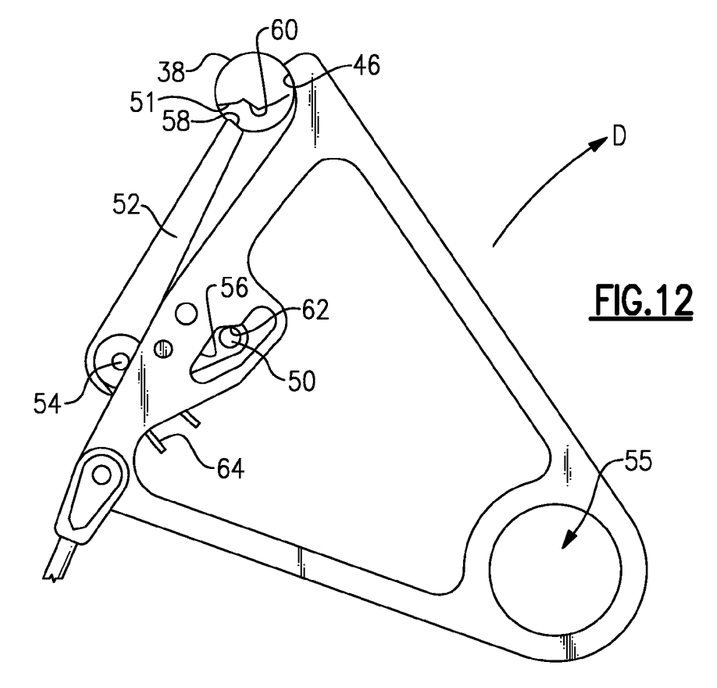
FIG. 12 is an isolated perspective view of component parts of the example stow abort mechanism during a stow sequence where the turbine blades of the RAT are in a position suitable for storing.

A successful stow sequence is described next. As shown in FIG. 12 with continuing reference to FIGS. 1 to 3, when the release pin 34 is received within the opening 72 as the RAT 14 is beginning to stow, the stop 46 of the release lever 44 remains positioned against the fixed bracket 38. A biasing member biases the release pin 34 into the opening 72. In this example, the biasing member is a spring 74. The biasing member also holds the stop 46 against the fixed bracket 38.

Figure 11:
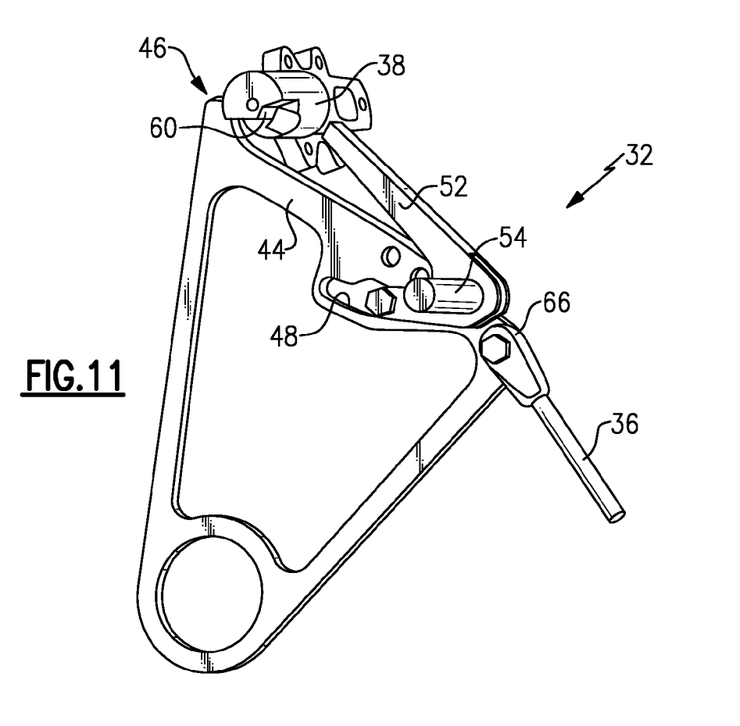
FIG. 11 is an isolated perspective view of component parts of the example stow abort mechanism after the turbine blades of the RAT have been moved to a position suitable for storing.

When moving from the fully deployed position of FIG. 11, the pawl pivot pin 54 and the pawl 52 rotate in the direction D of FIG. 12 relative to the release lever 44. The cam pin 50 rides along a radially outer surface 56 of the cam track 48 as the pawl 52 is rotated. A biasing member 64, such as a spring, biases the pawl 52 toward a position where the cam pin 50 rides along the radially outer surface 56. A person having skill in this art and the benefit of this disclosure would understand how to bias the pawl 52 in this way. After some rotating, the cam pin 50 contacts a ramp 62, which overcomes the biasing and pivots the cam pin 50 radially inward about the pawl pivot pin 54. Radially inward movement of the cam pin 50 causes the pawl 52 to rotate away from a position where the pawl 52 would contact the locking ridge 60, which allows the RAT 14 to continue pivoting to the stowed position 16. The ramp 62 contacting the cam pin 50 rotates the pawl 52 toward the pivot post 55 causing the pawl 52 to clear the locking ridge 60 by 0.15 inches (3.81 mm) in one example.

Figures 3, 4:
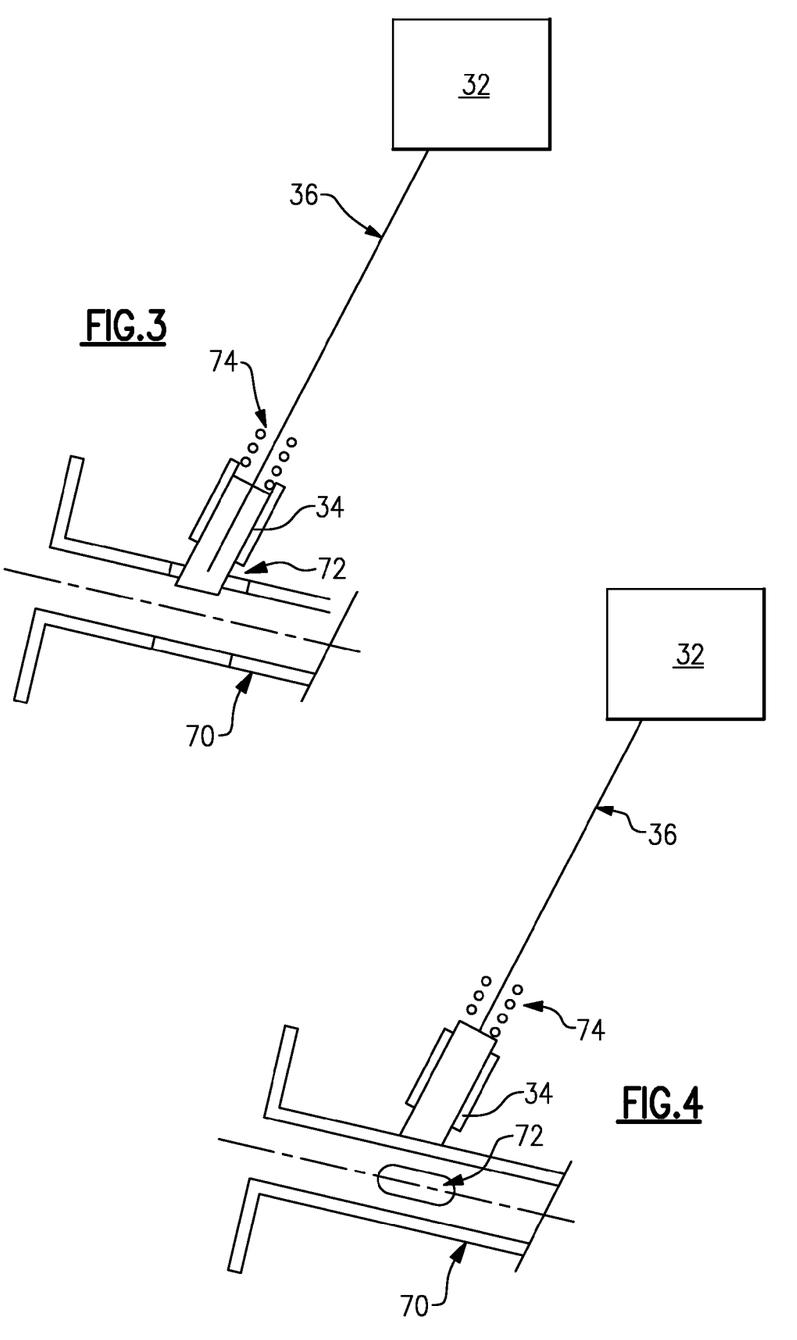
FIG. 3 shows a release pin in an engaged position and a schematic view of a stow abort mechanism.
FIG. 4 shows a release pin in a released position and a schematic view of a stow abort mechanism.
Figure 13:
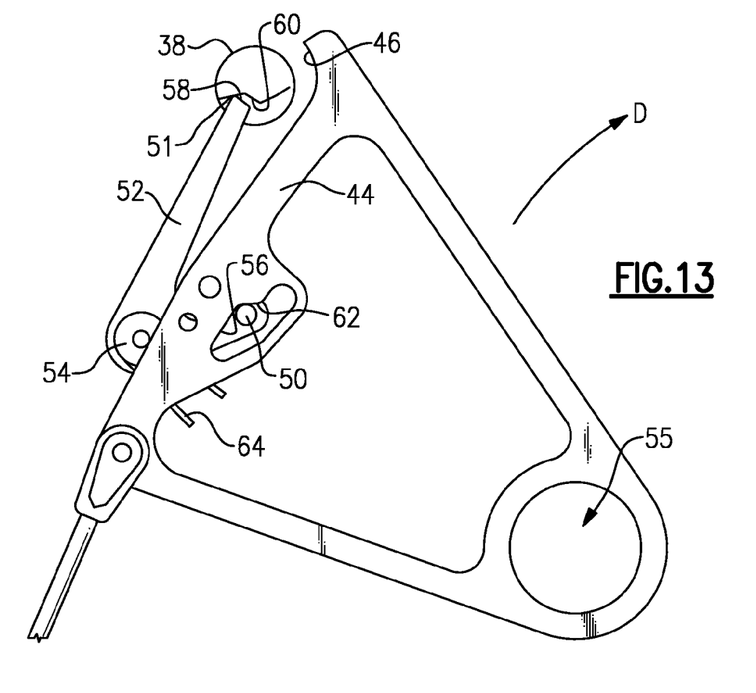
FIG. 13 is an isolated perspective view of component parts of the example stow abort mechanism during a stow sequence where the turbine blades of the RAT are in a position unsuitable for storing.

As shown in FIG. 13 with continuing reference to FIGS. 1 to 3, when the release pin 34 is not received within the opening 72, the release lever 44 is rotated in the direction D away from the fixed bracket 38 (note the gap between the bracket and stop 46). As the pawl pivot pin 54 and the pawl 52 rotate in the direction D relative to the release lever 44, the cam pin 50 rides along a radially outer surface 56 of the cam track 48. As appreciated, the ramp 62 has rotated in the direction D relative to the position of the ramp 62 in FIG. 11. When the release lever 44 is in this position, the cam pin 50 does not travel down ramp 62 and is not forced radially inward prior to the pawl 52 contacting the locking ridge 60. The pawl 52 contacts the locking ridge 60, which prevents the RAT 14 from moving to the stowed position.

Provisions are made for the pawl 52 being slightly out of position due to part tolerances. If the pawl 52 comes in slightly too far radially from pivot 55, a ramp 51 on fixed bracket 38 guides the pawl 52 to the correct locating positions. If the pawl 52 comes in slightly too low from debris buildup on the cam, the ramp angle of face 58 allows the pawl 52 to slide up stop surface 60 to the correct final stop position.

Figure 14:
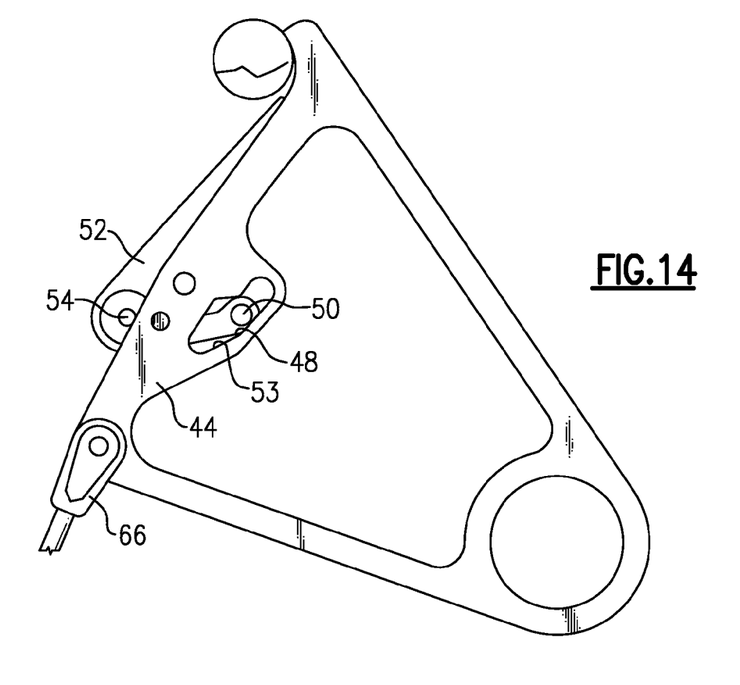
FIG. 14 is an isolated perspective view of component parts of an example stow abort mechanism during a deployment sequence when the RAT is about 59° deployed.
Figure 15:
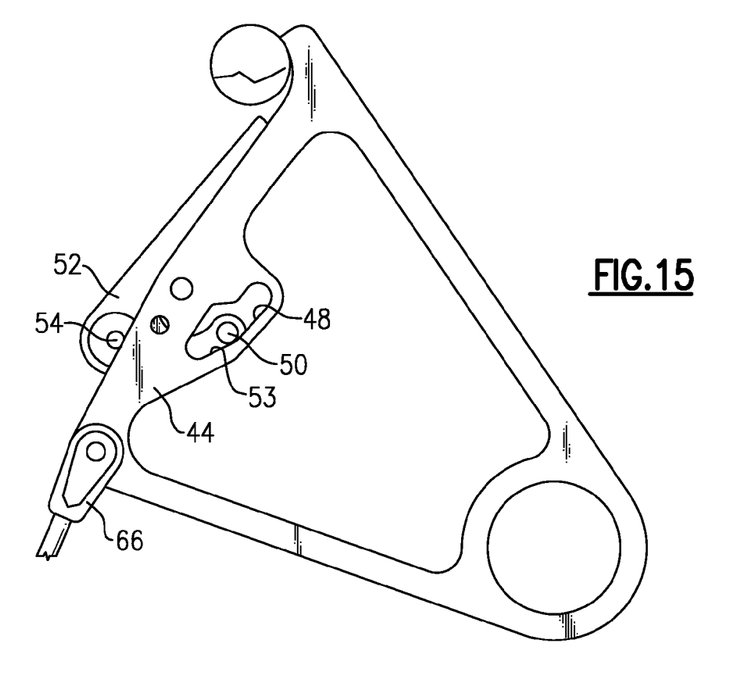
FIG. 15 is an isolated perspective view of component parts of an example stow abort mechanism during a deployment sequence when the RAT is about 63° deployed.

In some examples, when the RAT 14 moves to a deployed position the pawl 52 may be jammed or frozen so it cannot easily rotate about the pawl pin 54. As shown in FIGS. 14-15, the cam pin 50 does not contact a radially outer surface 53 of the cam track 48 on release lever 44 until relatively late in the deployment (after the turbine blades 28 have been released). The example cam track is specifically designed to allow for this motion in case the pawl pin 54 becomes jammed. At this point in the deployment, the RAT 14 can function even if pawl 52 is jammed and limiting further deployment. Furthermore, at this point in the deployment, the inertia is so great that the resistance offered by pawl 52 can be overcome. The radially outer surface 53, in this example, is ramped slightly at the trailing end. The ramp may push a frozen or sticky pawl 52 into a correct position.

Figure 16:
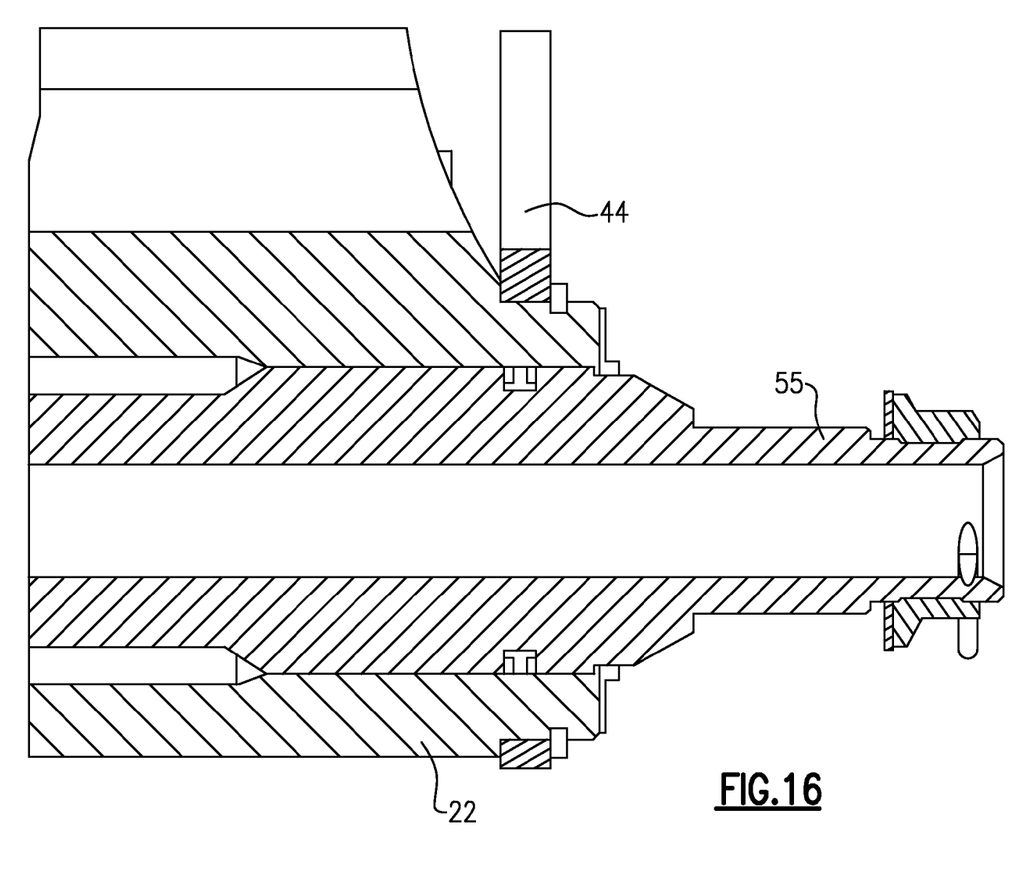
FIG. 16 is a section view of a pivot post for a release lever of the example stow abort mechanism.

Referring now to FIGS. 5, 6 and 16, the release lever 44 is connected to the generator 22 such that no relative motion is required until near full deployment. At this point in the deployment, the inertia is so great that the resistance offered by friction, debris, ice, etc. at the lever 44 pivot diameter can be easily overcome.

The example release lever 44 is covered with dry film lubrication, which helps avoids incorporating a bushing between the release lever 44 pivot diameter and the generator 22. Pawl 52 is also covered with dry film lubrication, which allows the area of the pawl 52 to be free of grease. Grease at these locations could slow the mechanism operation at cold temperatures.

Figure 17:
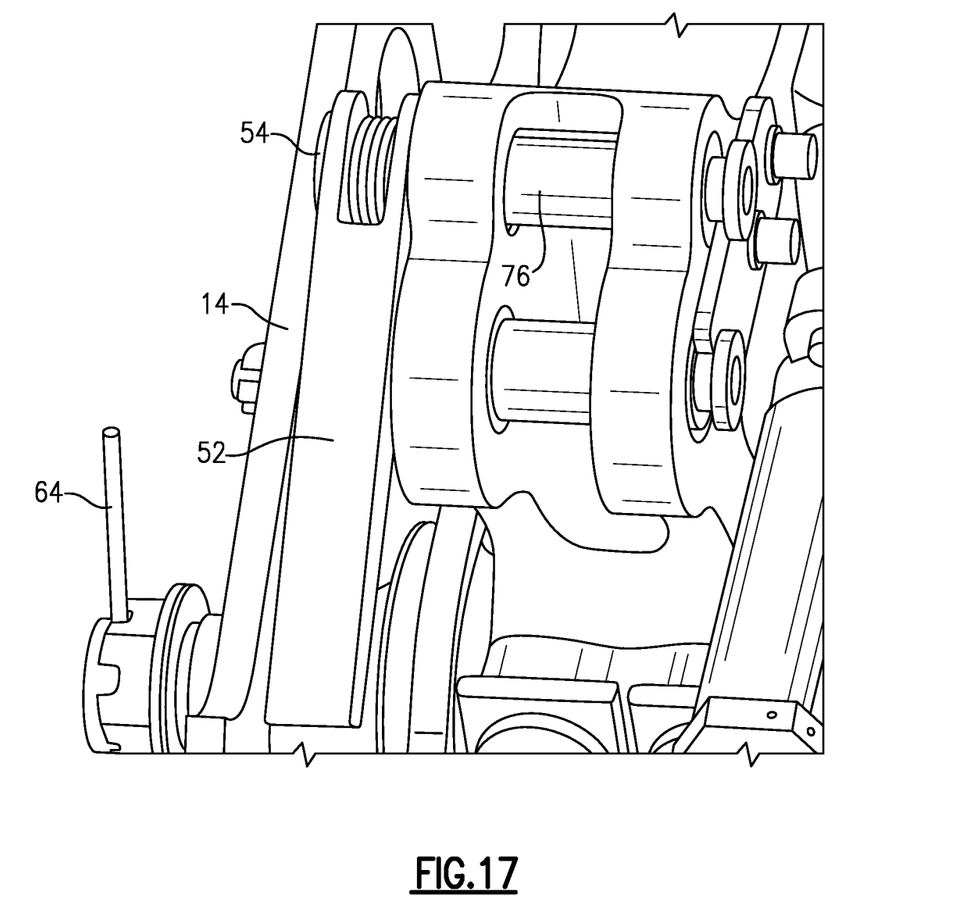
FIG. 17 is a section view of a pivot post for a pawl of the example stow abort mechanism.

Referring to FIG. 17, the pawl 52 rotates around pawl pivot pin 54. Alternatively, the pawl pivot pin 54 could rotate inside bushings in the housing of the generator 22. These arrangements are effective at resisting jamming due to ice, etc.

The disclosed stow abort mechanism 32 prevents movement to the stowed position 16 without properly aligned turbine blades 28. Moreover, the disclosed stow abort mechanism 32 operates without external sensors to assure stowage of the RAT 14 with the turbine blades 28 in the correct desired position.

Features of the example embodiments include a pawl that includes both a stop and a cam pin. Such a pawl is relatively robust and interfaces well with the surrounding environment. In addition, the pawl is mounted to the moving generator housing. No relative motion between the pawl and the generator housing is required until relatively late in the deployment. At this point in the deployment, the inertia is so great that the resistance offered by the pawl can be overcome.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A ram air turbine stow abort assembly comprising:
   a release pin movable between an engaged position that prevents rotation of a turbine drive shaft and a released position that allows rotation of the turbine drive shaft;
   a release lever rotatable about an axis in response to the release pin being in the engaged position or the released position; and
   a pawl having a link to the release lever, wherein the link causes the pawl to move toward the axis from a locking position to a clearance position, the pawl positioned to engage a lock when in the locking position to prevent movement of the ram air turbine assembly to a stowed position.

2. The ram air turbine stow abort assembly of claim 1, wherein the link comprises a cam pin guided within a cam track, wherein contact between the cam pin and the release lever moves the pawl from the locking position to the clearance position.

3. The ram air turbine stow abort assembly of claim 2, wherein the pawl includes the cam pin and the release lever includes the cam track.

4. The ram air turbine stow abort assembly of claim 2, wherein the lock is further from the axis than the cam pin.

5. The ram air turbine stow abort assembly of claim 2, wherein the cam track includes a ramp that contacts the cam pin to resist jamming.

6. The ram air turbine stow abort assembly of claim 1, wherein the pawl is biased toward the locking position.

7. The ram air turbine stow abort assembly of claim 1, wherein the pawl rotates about a pawl pivot when moving between the locking position and the clearance position.

8. The ram air turbine stow abort assembly of claim 7, wherein the pawl pivot is circumferentially spaced from the lock when the ram air turbine assembly moves from a deployed position to a stowed position.

9. The ram air turbine stow abort assembly of claim 1, wherein the lock is a locking ridge of a fixed structure of an aircraft.

10. The ram air turbine stow abort assembly of claim 9, wherein the release lever includes a stop that contacts the fixed structure when the ram air turbine is in a fully deployed position and the release pin is engaged.

11. The ram air turbine stow abort assembly as recited in claim 1, wherein the drive shaft includes an opening for receiving the release pin, and the release pin is biased toward the drive shaft.

12. A stow prevention assembly for a ram air turbine comprising:
   a release pin movable between an engaged position that fixes a position of a turbine drive shaft and a released position;
   a release lever movable about a pivot post in response to a position of the release pin;
   a pawl having a link to the release lever, the pawl movable between a clearance position and a locking position responsive to movement of the release lever; and
   a locking ridge engaged by the pawl when the pawl is in the locking position such that the ram air turbine is prevented from moving to a stowed position, wherein the locking ridge is radially further from the pivot post than all portions of the link.

13. The stow prevention assembly of claim 12, wherein the link comprises a cam track that drives the pawl from the locking position to the clearance position when the release lever moves responsive to the release pin being in the engaged position.

14. The stow prevention assembly of claim 12, wherein the locking ridge comprises a surface on a fixed bracket.

15. The stow prevention assembly of claim 12, wherein the release lever is pivotally mounted to a fixed structure supporting the ram air turbine.

16. A method of aborting stowage of a ram air turbine assembly, comprising:

moving a release pin between an engaged position that prevents rotation of a turbine drive shaft and a released position that allows rotation of the turbine drive shaft; and pivoting a release lever about an axis relative to a pawl in response to a position of the release pin, wherein the position of the release lever relative to the pawl selectively forces the pawl to move toward the axis from a locking position to a clearance position.

17. The method of claim 16, including biasing the pawl away from the axis toward a locking position and contacting a cam pin during the pivoting to overcome the biasing.

18. The method of claim 16, wherein the release lever forces the pawl to move to the clearance position when the release pin is in the engaged position and the ram air turbine moves toward a stowed position.

19. The method of claim 16, wherein the release lever permits the pawl to stay in the locking position when the release pin is in the released position and the ram air turbine moves toward a stowed position.

20. The method of claim 19, including contacting a lock with the pawl when the pawl is in the locking position, the contacting preventing the ram air turbine from moving to the stowed position.

\* \* \* \* \*